3,396,467
CUTTER FOR PIECES OF PIPING
Fred J. Scocozza, 6—12 123rd St.,
College Point, N.Y. 11222
Filed Feb. 27, 1967, Ser. No. 618,943
2 Claims. (Cl. 30—95)

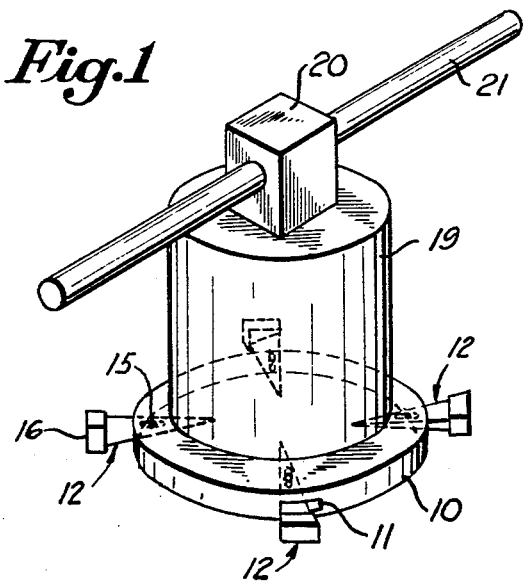
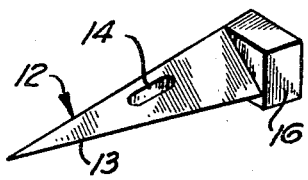
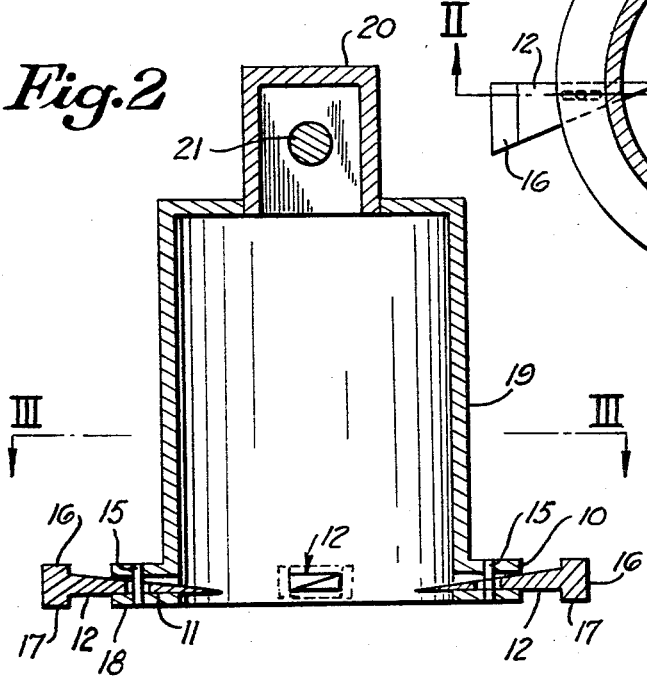
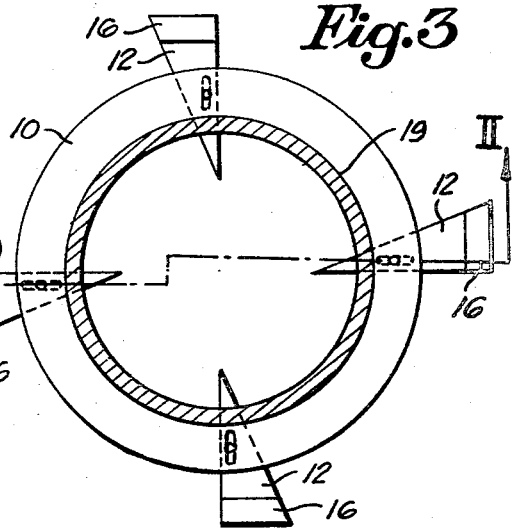
INVENTOR.
FRED J. SCOCOZZA
BY Richards & Geier
ATTORNEYS

# United States Patent Office 3,396,467
Patented Aug. 13, 1968

ABSTRACT OF THE DISCLOSURE

A cutter having inwardly projecting blades and adapted to be placed on the ground over a projecting pipe section so as to cut it off by a manually imparted rotary movement of the casing carrying the blades.

---

This invention relates to a pipe cutter and refers more particularly to a so-called lead bend cutter which is adapted to cut off pieces of piping projecting a short distance above ground. Such piping is often found in homes for supplying flushing water to bathrooms as well as in other locations. At the present time this piping is removed by manually operated saws. Since the pipe must be cut off very close to the ground, the use of a saw is very inconvenient and sometimes results in injuries to the hands of the users.

An object of the present invention is to eliminate this drawback through the provision of a cutter which may be easily and effectively used for cutting off so-called lead bends and other pieces of piping close to the ground or floor surface.

Other objects will become apparent in the course of the following specification.

In the accomplishment of the objectives of the present invention it was found desirable to provide a cutter which includes a ring adapted to be placed on the ground over the pipe section to be cut and carrying a plurality of blades having cutting edges extending beyond the inner circumference of the ring. The blades are preferably bevelled or contoured so that the cut made by the blades always remains on the same level. The blades extend through slots provided in the ring. They may be removed and replaced if necessary. The outer ends of the blades extend beyond the ring and terminate in flat angular pieces which are also located upon the ground. The ring is carried by a tubular casing the top of which has a holder for an elongated handle.

The invention will appear more clearly from the following detailed description when taken in connection with the accompanying drawing showing by way of example a preferred embodiment of the inventive idea.

In the drawing:

FIGURE 1 is a perspective view of a cutter constructed in accordance with the principles of the present invention.

FIGURE 2 is a longitudinal section through the cutter along the line II—II of FIG. 3.

FIGURE 3 is a transverse section through the cutter along the line III—III of FIG. 2.

FIGURE 4 is a perspective view of one of the blades on an enlarged scale.

The cutter shown in the drawing includes a ring 10 which can be placed on the ground over the pipe section to be cut. The ring 10 has a plurality of radially extending wide slots 11 adapted to receive the blades 12. While the drawing shows four blades 12 carried by the ring 10, obviously the number of the blades may be varied at will.

As best shown in FIG. 4, each blade 12 is bevelled or contoured so that its cutting edge 13 remains at the same level during the cutting operation. Thus the blade can not pull away or move up. The inner ends of the blades extend beyond the inner circumference of the ring 10 to the extent required for the cutting of a pipe (not shown) located inside the ring 10. The blades 12 are provided with slots 14 which make it possible to adjust the location of the blade inside the ring. The blades 12 are held in the slots 11 by pins 15. The pins 15 may be withdrawn so as to remove the blades. Then the blades can be resharpened or the worn out blades may be replaced by new ones.

The outer ends of the blades which extend beyond the ring 10 terminate in angular pieces 16. As shown in FIG. 2, the lower surfaces 17 of the pieces 16 are substantially in alignment with the lower surface 18 of the ring 10. Thus when the ring 10 is placed upon the floor, the end pieces 16 of the blades 12 will also rest upon the floor, thereby facilitating the cutting operation and its accuracy. Preferably, the cutting edges 13 of the blades 12 are located about ¼ inch above the ground level, but obviously this distance may be varied.

The ring 10 is firmly connected with an upper casing 19. A holder 20 is mounted on top of the casing 19 and is used to carry an elongated rod 21. The rod 21 serves as a handle. It may be held by the holder 20 with a tight fit or it may be threaded into the holder which will be then provided with inner screw threads (not shown).

In operation, the casing 19 with the ring 10 are placed over the pipe to be cut. These pipes are usually of the same diameter so that the location of the blades 12 in the slots 11 can be so adjusted that their cutting edges 13 will extend tangentially to the outer surface of the pipe and will contact the outer surface. Then a turning of the handle 21 will suffice to enable the cutting edges 13 to penetrate into the pipe and to cut it off. As already stated, the bevelled shape of the blades will prevent their upper movement so that the cut will be along the same level.

It is apparent that the example described above has been given solely by way of illustration and not by way of limitation and that it is capable of many variations and modifications within the scope of the present invention. All such variations and modifications are to be included within the scope of the present invention.

What is claimed is:

1. A cutter for a pipe, comprising a ring, a plurality of bevelled blades extending radially through slots formed in said ring, said blades having outer angular end pieces with cutting edges for cutting a pipe enclosed by said ring, and means connected with said ring for turning said ring along with said blades to cause said cutting edges to penetrate into and cut said pipe.

2. A cutter in accordance with claim 1, wherein the lower surfaces of said end pieces are in alignment with the lower surface of said ring.

References Cited

UNITED STATES PATENTS

| 46,703 | 3/1865 | Renshaw | 30—98 |
|---|---|---|---|
| 134,007 | 12/1872 | Sanborn | 30—99 |
| 911,107 | 2/1909 | Bartholomaus | 30—95 |
| 1,055,970 | 3/1913 | Erickson | 30—95 |
| 2,202,416 | 5/1940 | Day | 30—95 |
| 2,518,074 | 8/1950 | Sauters | 30—96 X |

MYRON C. KRUSE, *Primary Examiner.*